United States Patent
Brunck et al.

(10) Patent No.: US 7,021,165 B2
(45) Date of Patent: Apr. 4, 2006

(54) SENSOR INSERTION AND REMOVAL APPARATUS AND METHODS USING THE SAME

(75) Inventors: Nicholas J. Brunck, West Chester, OH (US); Paul J. Barker, West Chester, OH (US); Eric S. Boltz, Cincinnati, OH (US); Keith Roy, South Wales (GB)

(73) Assignee: Marathon Sensors, Inc., Cincinnati, OH (US)

( * ) Notice: Subject to any disclaimer, the term of this patent is extended or adjusted under 35 U.S.C. 154(b) by 0 days.

(21) Appl. No.: 11/009,211

(22) Filed: Dec. 10, 2004

(65) Prior Publication Data

US 2005/0126317 A1    Jun. 16, 2005

Related U.S. Application Data

(60) Provisional application No. 60/529,183, filed on Dec. 12, 2003.

(51) Int. Cl.
*G01N 17/00* (2006.01)

(52) U.S. Cl. ....................................... 73/866.5

(58) Field of Classification Search ............... 73/866.5, 73/863.82, 863.85, 86; 374/141, 208; 324/447
See application file for complete search history.

(56) References Cited

U.S. PATENT DOCUMENTS

| | | | |
|---|---|---|---|
| 4,056,887 A * | 11/1977 | Tucker et al. | 33/715 |
| 4,595,300 A * | 6/1986 | Kaufman | 374/170 |
| 4,631,961 A * | 12/1986 | Yohe et al. | 73/866.5 |
| 5,936,168 A * | 8/1999 | Welker | 73/866.5 |
| 5,996,430 A * | 12/1999 | Bellis, Sr. | 73/866.5 |
| 6,357,310 B1 * | 3/2002 | Blanchet et al. | 74/89.21 |
| 6,357,470 B1 * | 3/2002 | Evans et al. | 137/317 |

* cited by examiner

*Primary Examiner*—Robert Raevis
(74) *Attorney, Agent, or Firm*—Dinsmore & Shohl LLP (57) ABSTRACT

A sensor insertion and removal apparatus for inserting and/or removing a sensor into/from a chamber having at least one sensor port. The apparatus has a port collar configured to connect near to or at the sensor port of the chamber and to allow the sensor to pass through the port collar into the chamber. One or more cables or screws are attached to the sensor and utilized to insert and remove the sensor at a predefined rate into the chamber.

2 Claims, 11 Drawing Sheets

SENSOR INSERTION AND REMOVAL APPARATUS AND METHODS USING THE SAME

RELATED APPLICATIONS

This application claims the benefit of U.S. Provisional Application No. 60/529,183, filed Dec. 12, 2003. The entire disclosure of which is hereby incorporated by reference.

TECHNICAL FIELD

The present invention relates generally to apparatuses for inserting and/or removing a sensor into/from a chamber, and more specifically to unique apparatuses for inserting and/or removing sensors into/from a chamber at a predefined rate of insertion.

BACKGROUND OF THE INVENTION

Sensors are often utilized to measure gas concentrations in various embodiments such as a chamber or furnace. To test the environment, the sensor is inserted into the testing area. Typically, parts of the sensor are ceramic. The sensor may be inserted into a very high temperature environment (~2000° F.). As such, the sensor must be inserted slowly to avoid thermal shock to the ceramic parts of the sensor. Similarly, when a sensor is removed, it must be gradually done to avoid thermal shock to the sensor. In the past, manual insertion rates of one inch every two minutes have been found to avoid thermal shock. Typically, the installation of a sensor is done manually and often causes the installer to be exposed to elevated temperatures in a potentially hazardous environment. Sensors are typically mounted on one of the walls of the chamber and inserted horizontally or mounted on the roof and inserted vertically. As such, there is a need for a sensor insertion apparatus which would at least partially automate the process of inserting and/or removing the sensor into the chamber.

SUMMARY OF THE INVENTION

The present invention is directed to apparatus for insertion and/or removal of a sensor into/from a chamber in which a predefined insertion/removal rate is required due to thermal shock potential of the sensor.

One embodiment of the present invention is an apparatus for inserting a sensor into a chamber. The apparatus comprises: a port collar, wherein the port collar is configured to connect near to or at the sensor port of the chamber, and further wherein the port collar is configured to allow a sensor to be inserted through the port collar into the chamber; one or more cables attached to the sensor and the port collar; and at least one tension device, wherein the tension device is configured to place a force on the cables attached to the sensor, such that the sensor is drawn into the chamber at a predefined rate of insertion.

Another embodiment of the present invention is an apparatus for inserting and/or removing a sensor into/from a chamber having at least one sensor port. The apparatus comprises: a port collar, wherein the port collar is configured to connect near to or at the sensor port, and further wherein the port collar is configured to allow a sensor to be inserted through the port collar into the chamber; one or more motorized rollers in friction communication with the sensor, wherein the motorized motors are configured to insert and/or remove the sensor into the chamber at a predefined rate of insertion.

Another embodiment of the present invention is an apparatus for inserting and/or removing a sensor into/from a chamber having at least one sensor port. The apparatus comprises a port collar, wherein the port collar is configured to connect near to or at the sensor port of the chamber, and further wherein the port collar is configured to allow a sensor to be inserted through the port collar into the chamber; one or more elongated screws, wherein each elongated screw is connected to a motorized screw base on the port collar, wherein the motorized screw base is configured to rotate in a first and second direction and correspondingly rotate the elongated screw in the same first and second direction; a probe head collar, wherein the probe head collar is configured to attach to the sensor on or near the sensor probe's head, and further wherein the probe head collar contains at least one opening configured to correspond with the elongated screw such that the opening on the probe head collar is threaded in a corresponding thread relationship to the elongated screw, wherein when the elongated screw is rotated in the first direction, the probe head collar and sensor probe are drawn closer to the port collar and the chamber, and wherein when the elongated screw base is rotated in a second direction, the probe head collar and sensor probe are drawn away from the port collar and the chamber.

Another embodiment of the present invention is an apparatus for inserting and/or removing a sensor into/from a chamber. The apparatus comprises: a port collar, wherein the port collar is configured to connect near to or at the sensor port, and further wherein the port collar has a threaded opening configured to allow a sensor to be inserted through the port collar into the chamber; one or more motors attached to the port collar; an elongated roller attached to the motor, such that when the motor is rotated in a first direction the roller is turned in a corresponding first direction and when the motor is rotated in a second direction the roller is turned in a corresponding second direction; a sensor having a proximal end and a distal end, wherein the distal end of the sensor comprises a sensor insertion cap configured to turn the sensor in registration with the elongated roller, and wherein the sensor is threaded near the proximal end, such that the threaded sensor corresponds in registration to the threaded opening in the port collar.

Another embodiment of the present invention is an apparatus for inserting and/or a sensor into/from a chamber having at least one sensor port. The apparatus comprises: a pulley tower attached to the chamber and located near the sensor port, wherein the pulley tower comprises an elongated shaft with a pulley at the top, configured to allow a cable to run through the pulley at the top of the elongated shaft, and wherein one end of the cable is attached to a probe sensor head of a sensor and the other end of the cable is attached to a wind-up reel, such that when the wind-up reel is turned, in a first direction, the sensor is inserted into the chamber, and when the wind-up reel is turned in a second direction, the sensor is removed from the chamber.

BRIEF DESCRIPTION OF THE DRAWINGS

While the specification concludes that claims particularly pointing and distinctly claiming the present invention, it is believed the same will be better understood from the following description taken in conjunction with the accompanying drawings in which:

The embodiments set forth in the drawings are illustrative in nature and not intended to be limiting of the invention defined by the claims. Moreover, individual features of the drawings and the invention will be more fully apparent and understood in view of the detailed description.

DETAILED DESCRIPTION

Reference will now be made in detail to various embodiments of the invention, examples of which are illustrated in the accompanying drawings, wherein like numerals indicate similar elements through the views.

Figure 1:
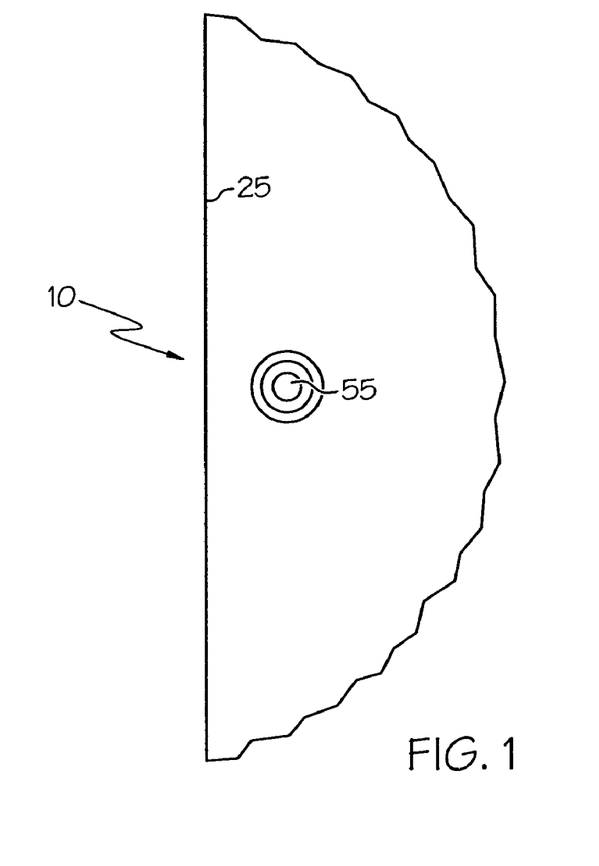
FIG. 1 is a schematic illustration of an exemplary chamber and probe port utilized by the present invention.

As mentioned above, sensors are often utilized to measure various environmental factors, such as: gas concentrations and/or temperatures in different environments. One of the environments is a chamber (furnace). A typical chamber 10 is depicted in FIG. 1. As used herein, "chamber" means any furnace, compartment, vessel or the like in which a sensor is inserted into the chamber 10 for measurement of various environmental factors. The chamber 10 has an exterior chamber wall 25 and typically has one or more probe ports 55. The probe port 55 is utilized to insert the sensor into the chamber while minimizing loss of conditions in the chamber. Typically, the probe port 55 is threaded and when not utilized for testing can be sealed with a threaded cap. Typically, probe ports 55 have a 1 inch diameter and are threaded with an NPT (National Pipe Thread) standard. Vertical probe ports on top of a chamber may not be threaded. In this situation, a high temperature insulator or sealant (such as Kaowool) is utilized to seal the probe to the chamber.

Figure 1A:
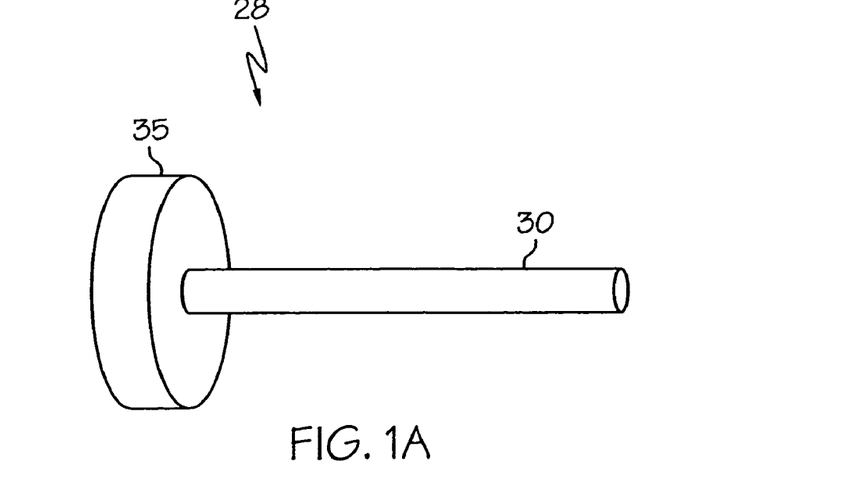
FIG. 1A is a schematic illustration of an exemplary sensor utilized by the present invention.

FIG. 1A illustrates a typical sensor 28 known to one skilled in the art such as an oxygen sensor. The sensor 28 comprises an elongated sensor shaft 30 and a probe head 35. The elongated sensor shaft 30 is typically inserted into the probe port 55 on a chamber 10 to determine gas concentrations inside the chamber. Parts of the sensor shaft 30 are typically ceramic and as such, care must be utilized during insertion and removal of the sensor to avoid thermal shock to the ceramic material.

Figure 2:
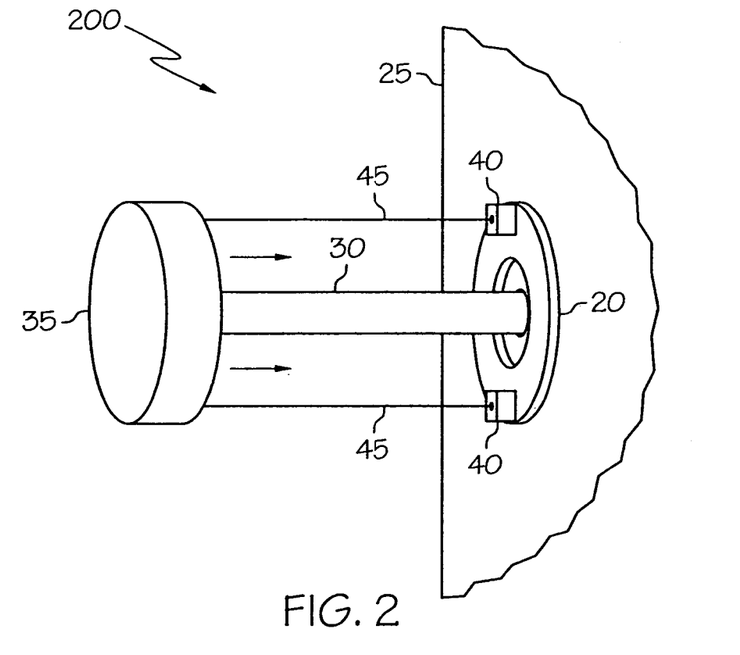
FIG. 2 is a schematic illustration of an exemplary sensor insertion apparatus of the present invention.

One embodiment of the invention is depicted in FIG. 2. FIG. 2 illustrates an exemplary apparatus 200 for inserting a sensor 28 into a chamber 10 through the probe port 55. The apparatus 200 comprises a port collar 20, wherein the port collar 20 is configured to connect near to or at the sensor port 55, and further wherein the port collar 20 is configured to allow the sensor shaft 30 to be inserted through the port collar 20 into the chamber 10. One or more cables 45 is attached to the sensor probe head 35 and the port collar 20. In addition, at least one tension device 40 is in communication with the cable 45, and wherein the tension device is configured to place a force on the cable 45 attached to the sensor probe head 35, such that the sensor shaft 30 is drawn into the chamber 10 at a predefined rate of insertion. Exemplary tension devices 40 include springs, a mechanical timer with release off a mainspring, and geared motor.

Figure 3:
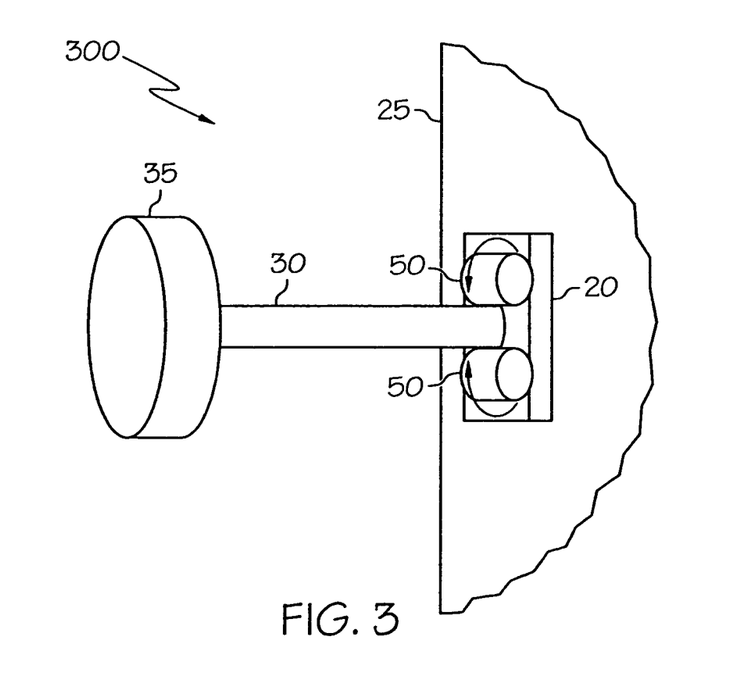
FIG. 3 is a schematic illustration of an exemplary sensor insertion/removal apparatus of the present invention.

Another embodiment of the invention is depicted in FIG. 3. FIG. 3 illustrates an exemplary apparatus 300 for inserting and/or removing a sensor 28 into/from a chamber 10 having at least one probe port 55. The apparatus 300 comprises a port collar 20, wherein the port collar 20 is configured to connect near to or at the probe port 55, and further wherein the port collar 20 is configured to allow a sensor shaft 30 to be inserted through the port collar 20 and into the chamber 10. In one embodiment, the port collar 20 may comprise a threaded portion to allow the port collar 20 to be screwed into the probe port 55. One or more motorized rollers 50 are attached to the port collar 20. The motorized rollers 50 are configured to allow the sensor shaft 30 to be inserted between the rollers 50, such that when the rollers 50 are turned in a first direction, the sensor shaft 30 is inserted into the chamber 10, and when the rollers are moved in a second direction, the sensor shaft 30 is removed from the chamber 10. As one skilled in the art will appreciate, the rollers can be powered by electric motors, spring wound tension motors and the like. The rollers 50 are configured to turn at a predefined rate, to prevent thermal shock to the ceramic sensor 28. One exemplary insertion rate is one inch for every two minutes.

Figure 4:
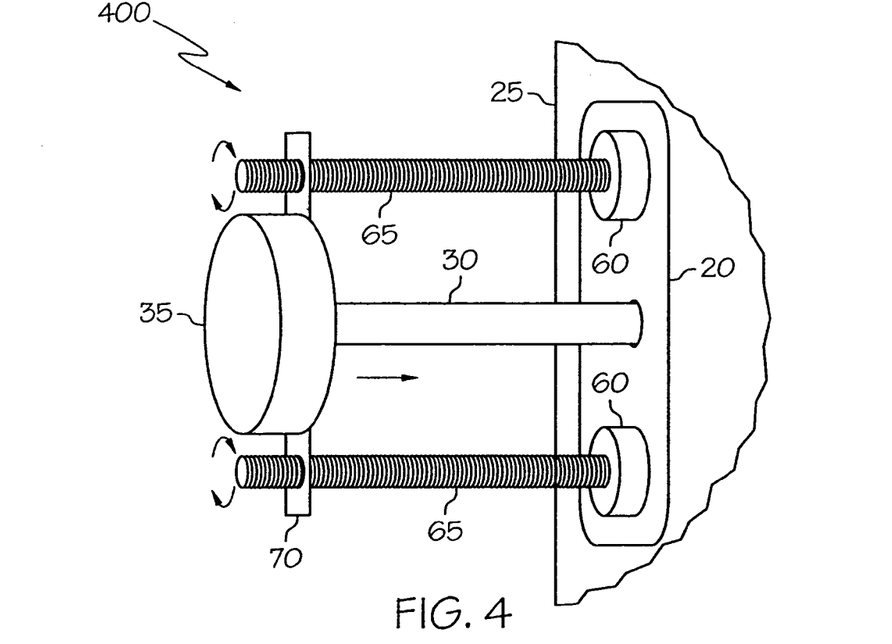
FIG. 4 is a schematic illustration of an exemplary sensor insertion/removal apparatus of the present invention.
Figure 8:
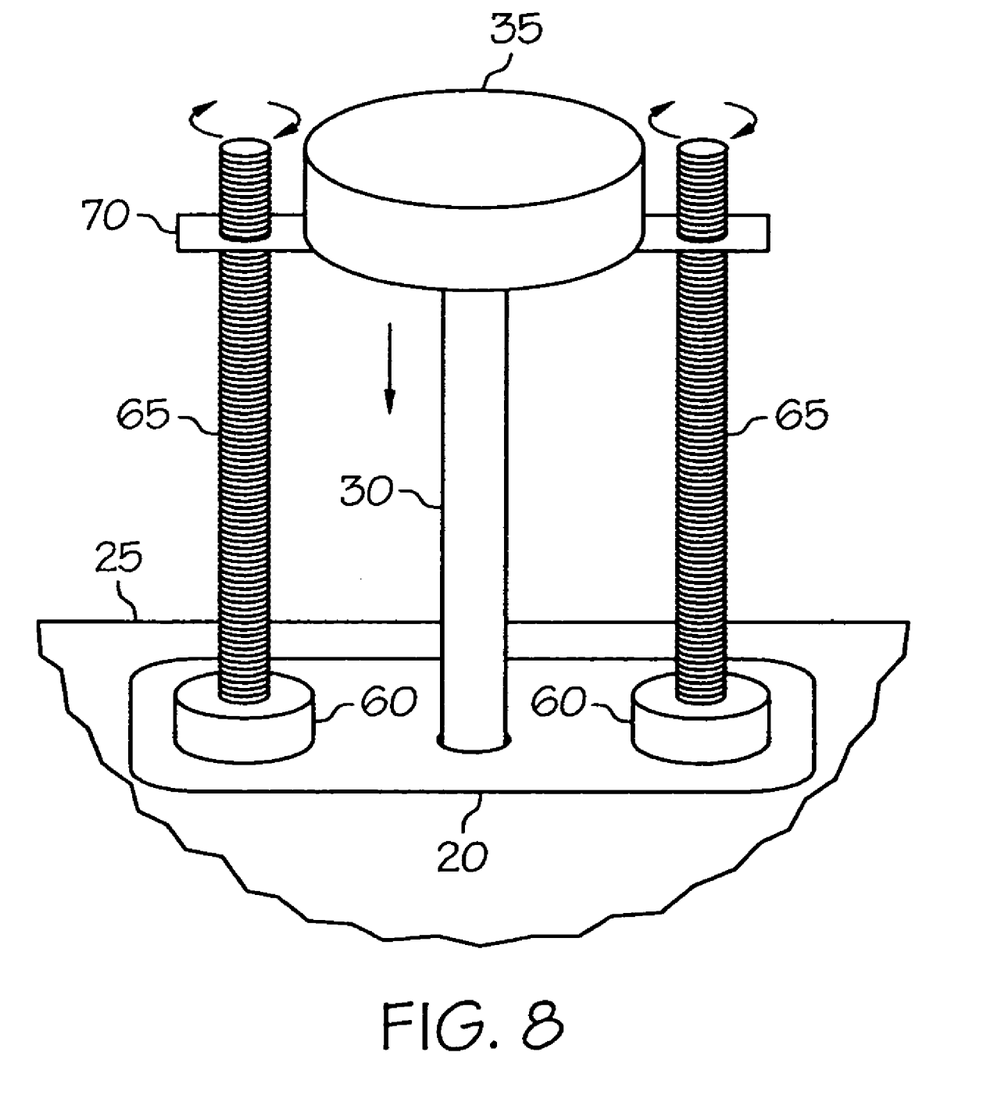
FIG. 8 is a schematic illustration of an exemplary sensor insertion/removal apparatus of the present invention.

Another embodiment of the present invention is illustrated in FIG. 4. FIG. 4 illustrates an apparatus 400 for inserting and/or removing a sensor 28 into/from a chamber 10. The apparatus 400 comprises a port collar 20, wherein the port collar 20 is configured to connect near to or at the probe port 55 on the chamber 10. In addition, the port collar 20 is configured to allow a sensor shaft 30 to be inserted through the port collar 20 into the chamber 10. The apparatus 400 further comprises one or more motorized screw bases 60 and elongated screws 65 connected to the motorized screw base(s) 60, such that when the screw base 60 rotates, the attached elongated screw 65 is turned in a corresponding direction. In one embodiment, a probe head collar 70 is attached to the sensor 28 near the probe head 35. The probe head collar 70 comprises at least one corresponding opening having threads to match the threads of the elongated screw 65. The probe head collar 70 is secured to the sensor 28 such that when the elongated screw 65 is turned in a first direction, the probe head collar 70 is threaded down the elongated screw, and as a result the sensor 28 attached to the probe head collar 70 is drawn closer to the chamber wall 25 and the sensor shaft 30 is inserted into the chamber 10. When the screw base 60 is rotated in a second direction, the probe head collar 70 is threaded up the elongated screw shaft 65 which results in the sensor 28 being drawn away from the chamber 10. As one skilled in the art will appreciate, in another embodiment, the probe head collar 70 could be incorporated into the probe head 35 of the sensor 28. In another embodiment, the apparatus 400 can be utilized to insert a sensor 28 vertically into the roof of a chamber 10 as illustrated in FIG. 8.

Figure 5:
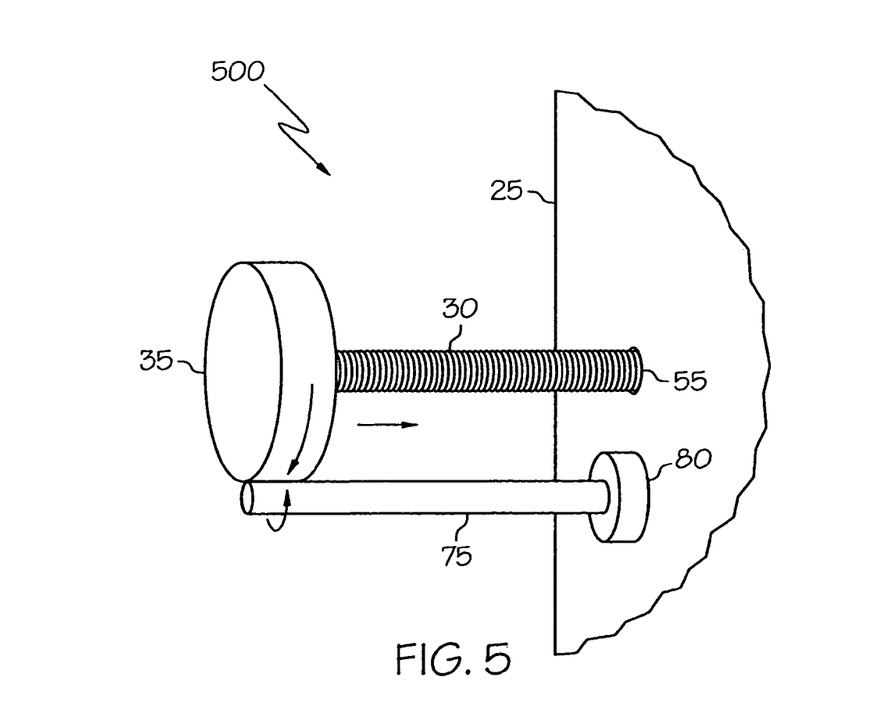
FIG. 5 is a schematic illustration of an exemplary sensor insertion/removal apparatus of the present invention.

Another embodiment of the present invention is illustrated in FIG. 5. FIG. 5 illustrates an exemplary apparatus 500 for inserting and/or removing a sensor 28 into/from a chamber 10. The apparatus 500 comprises an elongated roller motor 80 attached to the chamber wall 25 near the probe port 55. In one embodiment, the elongated roller motor 80 may be attached to a port collar 20, wherein the port collar 20 is configured to connect near to or at the probe port 55. Attached to the elongated roller motor 80 is an elongated roller 75. At least a portion of the elongated roller 75 is in friction contact with the probe head 35. In one embodiment, the elongated roller 75 and probe head 35 may have corresponding gear or threads to enhance the rotation imparted to the sensor 28. In addition, the sensor shaft 30 of the sensor 28 is threaded. The threading of the sensor shaft 30 corresponds to the same threading on the probe port 55. In another embodiment, the sensor shaft 30 threading corresponds to the port collar 20 threading. When the elongated roller motor 80 is turned in a first direction, the elongated roller 75 moves in the corresponding direction and the probe head 35 is rotated in a corresponding first direction, thereby turning the threads on the sensor shaft 30 in registration with the probe port 55 such that the sensor shaft 30 is drawn into the chamber 10. Similarly, when the elongated roller motor 80 is turned in a second direction, the elongated roller 75 moves in a second direction and correspondingly the probe head 35 is turned in a second direction resulting in the sensor shaft 30 being drawn away from the chamber 10.

Figure 6:
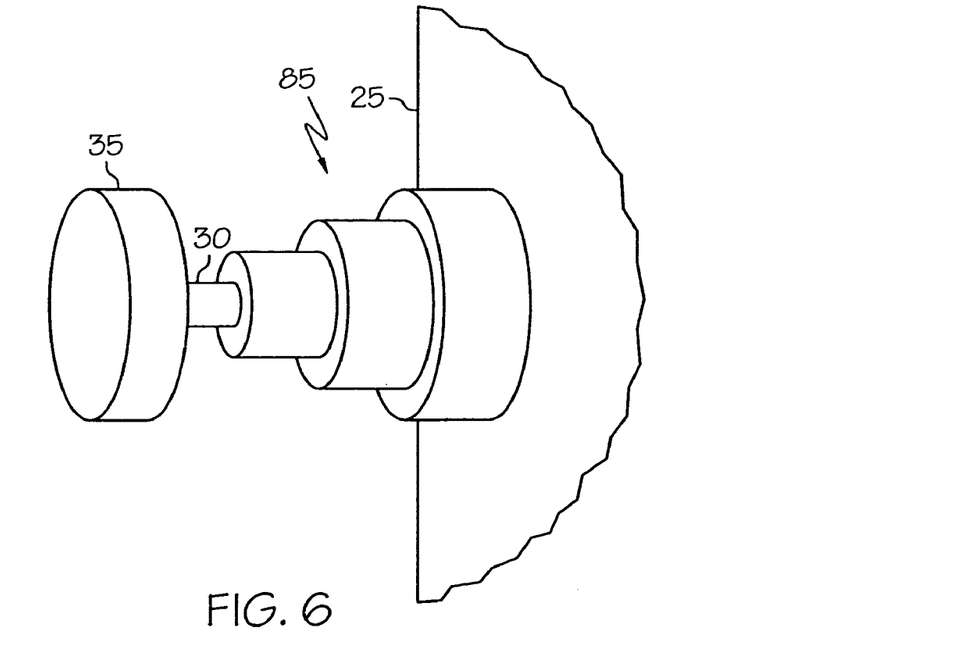
FIG. 6 is a schematic illustration of an exemplary sensor insertion/removal apparatus of the present invention.

Another embodiment of the invention is depicted in FIG. 6. FIG. 6 illustrates a telescoping tower 85 which can be utilized to help maintain the sensor 28 in a horizontal and/or vertical position when inserted and/or removed into/from the chamber 10 on the side of the chamber wall 25. The telescoping collar 85 minimizes the amount of friction caused by the sensor 28 being out of horizontal and/or vertical alignment and prevents the sensor shaft 30 from being potentially jammed in the probe port 55 and possibly damaging the sensor 28. The telescoping collar 85 can be attached to the chamber wall 25. In another embodiment, the telescoping collar 85 may be attached to or part of the port collar 20. As one skilled in the art will appreciate, the telescoping collar 85 can be utilized with other embodiments of the present invention in which maintaining horizontal position of the sensor is important.

Figure 7:
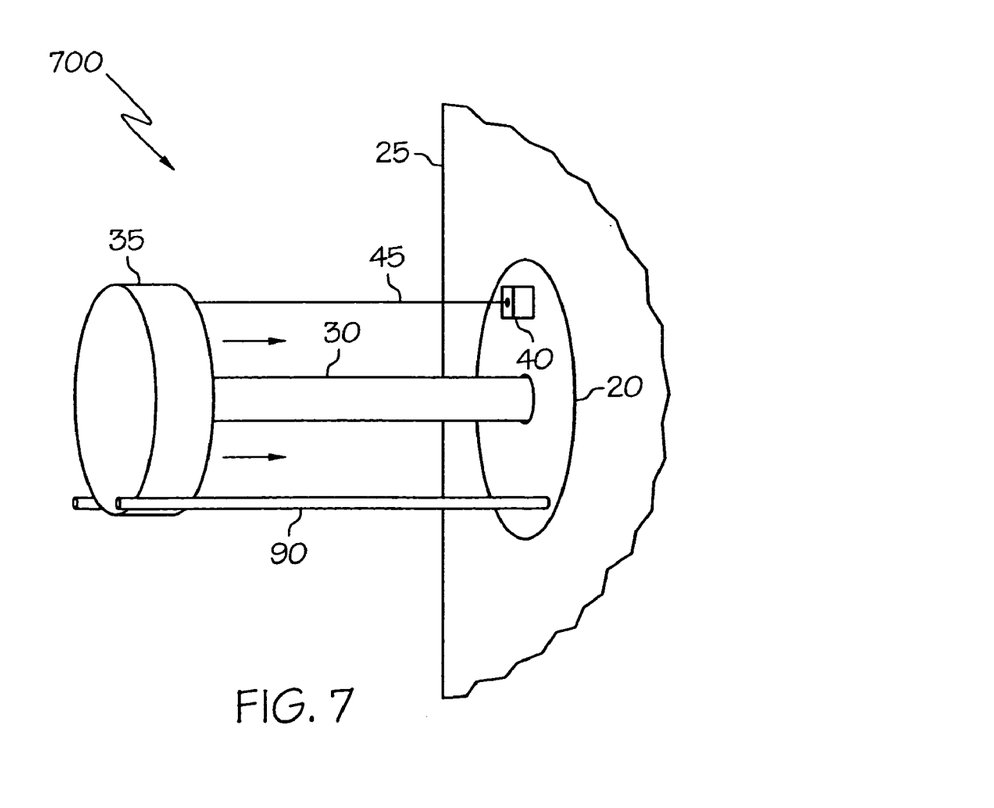
FIG. 7 is a schematic illustration of an exemplary sensor insertion/removal apparatus of the present invention.

Another embodiment of the invention is depicted in FIG. 7. FIG. 7 illustrates an apparatus 700 for inserting a sensor 28 into a chamber 10, wherein the chamber 10 has at least one probe port 55. The apparatus 700 comprises a port collar 20 attached to the probe port 55. The port collar 20 is configured to fit around the probe port 55 on the chamber wall 25 and further wherein the port collar 20 is configured to allow a sensor 28 to be inserted through the port collar 20 into the chamber 10. At least one spring loaded or motorized cable 45 is attached to the probe head 35 of the sensor-28. The other end of the cable 45 is attached to a tensioning device 40 on the port collar 20. Two or more elongated support rods 90 are attached to the port collar 20 and configured to allow the probe head 35 to rest on the support rods 90 and allow the sensor shaft 30 to remain in a horizontal position to minimize insertion difficulties into the chamber 10. The tensioning device 40 places tension on the cable and draws the probe head 35 towards the furnace wall 45, thus resulting in a sensor shaft 30 being inserted into the chamber 10.

Figure 9:
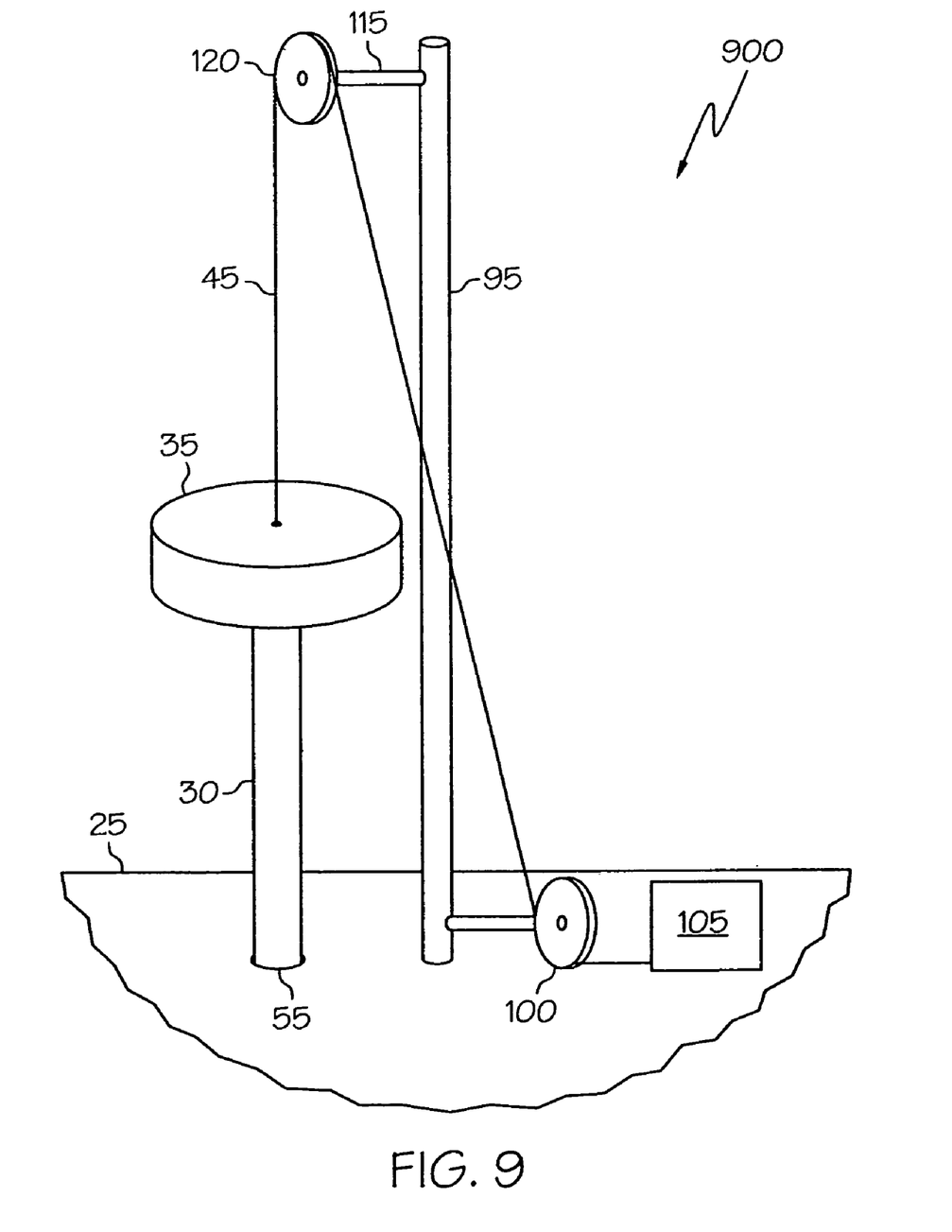
FIG. 9 is a schematic illustration of an exemplary sensor insertion/removal apparatus of the present invention.

Another embodiment of the present invention is depicted in FIG. 9. FIG. 9 illustrates an exemplary apparatus 900 for inserting and/or removing a sensor 28 into/from a chamber 10 through a probe port 55. The apparatus 900 comprises a pulley tower 95. The pulley tower 95 is attached to the chamber wall 25 and extends perpendicularly from the chamber wall 25 to at least the length of the sensor 28. At the end of the pulley tower 95 is a pulley arm 115. The pulley arm 115 extends parallel to the top of the chamber 10. At the end of the pulley arm 115 is a pulley 120. The pulley tower 95 is positioned on the chamber wall 25 such that the pulley 120 on the pulley arm 115 of the pulley tower 95 is directly above the probe head 35 of the sensor 28 to be inserted and/or removed into/from the chamber 10. A cable 45 is attached to the probe head 35 of the sensor 28 and the cable is run through the pulley 120 down to a windup reel 100 located on or near the chamber wall 25. The windup reel 100 may be motorized 105 or utilize a ratchetable windup cable release. When the windup reel 100 is rotated in a first direction, additional lengths of cable 45 are released from the windup reel 100 allowing the sensor 28 to be inserted through the probe port 55 into the chamber 10. When the windup reel is rotated in a second direction, a length of the cable 45 is wound up on the windup reel 100, thus resulting in tension being placed on the cable 45 and the sensor head 35 resulting in the sensor 28 being drawn away from the chamber 10.

Figure 10:
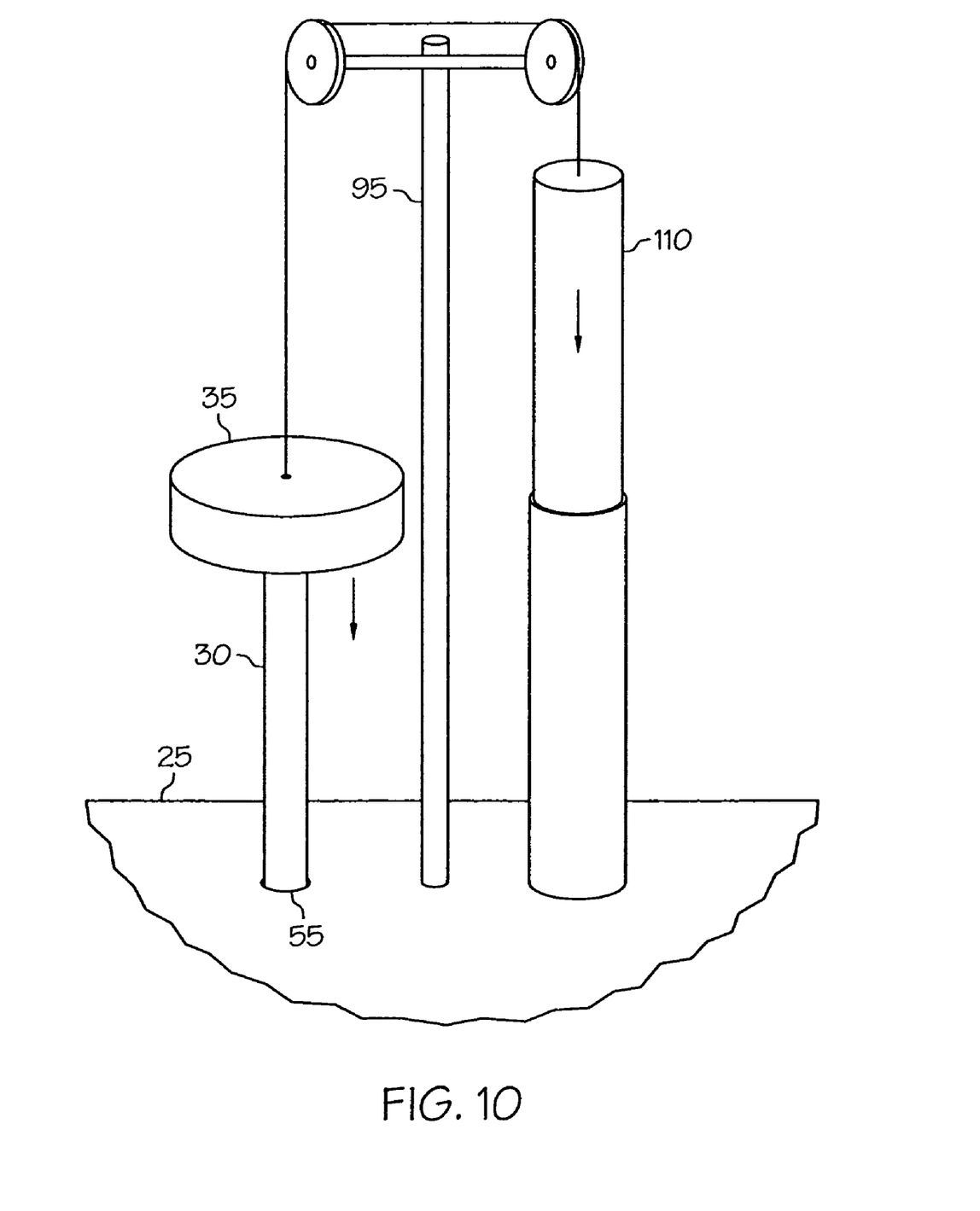
FIG. 10 is a schematic illustration of an exemplary sensor insertion/removal apparatus of the present invention.

Another exemplary embodiment is illustrated in FIG. 10. In this embodiment, the windup reel 100 has been replaced by a hydraulic or pneumatic cylinder 110. The hydraulic or pneumatic cylinder 110 can also be configured to counteract the force of gravity and slowly drop the sensor 28 into the chamber 10 through the probe port 55. In addition, the hydraulic or pneumatic cylinder 110 can be activated to lower the cylinder thus resulting in the sensor 28 being drawn away from the chamber 10.

Figure 11:
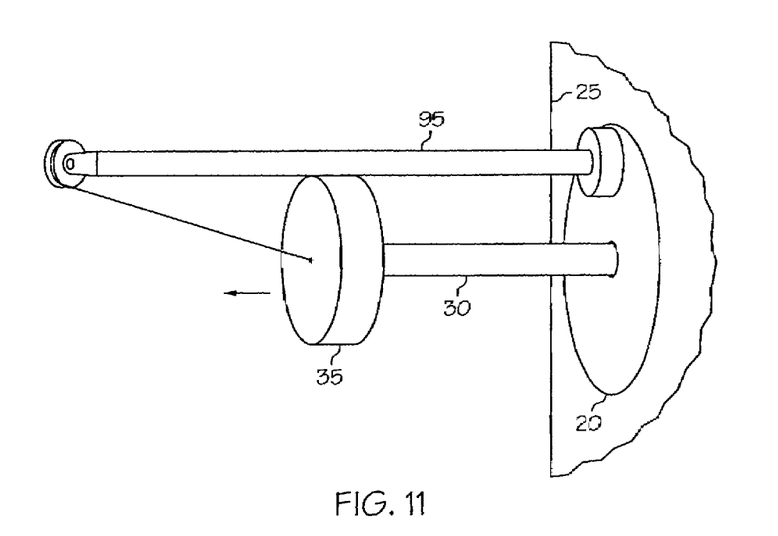
FIG. 11 is a schematic illustration of an exemplary sensor insertion/removal apparatus of the present invention.

FIG. 11 illustrates another exemplary embodiment utilizing the pulley tower 95. In this embodiment, the pulley tower 95 can be utilized to remove the sensor 28 from the chamber 10 when the sensor 28 is in a horizontal position on the chamber 10. Tension is placed on the cable 45 which subsequently places the tension on the probe head 35 and the sensor shaft 30 is drawn away from the chamber 10.

Figure 12:
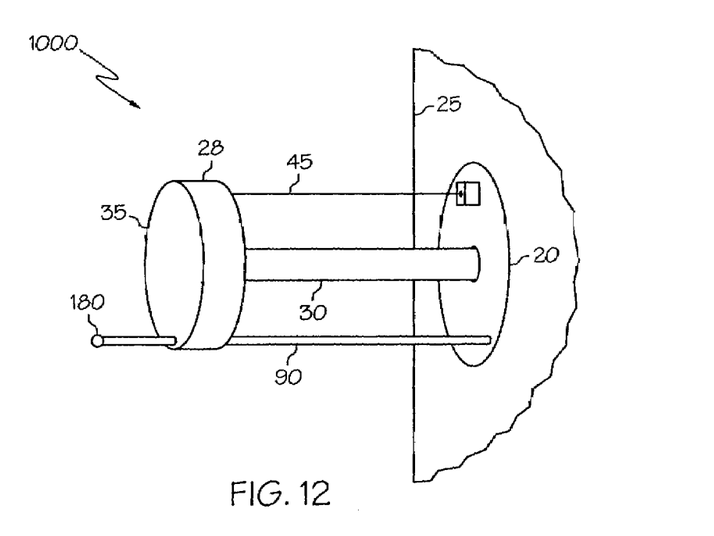
FIG. 12 is a schematic illustration of an exemplary sensor insertion/removal apparatus of the present invention.

In another embodiment of the present invention, the sensor is integrated into the insertion/removal apparatus. For example, the sensor probe head may be configured to accomplish the same function as the probe head collar 70. One example is depicted in FIG. 12. FIG. 12 illustrates an exemplary sensor apparatus 1000 for inserting a sensor 28 into a chamber 10 through a probe port 55. In the embodiment, the probe head 35 of the sensor 28 is configured to attach to a cable 45 and allow one or more elongated rods 90 to pass through the probe head 35. At the end of the elongated rod 90, a stopper 180 is placed to prevent the sensor 28 from being removed from the insertion/removal apparatus 1000.

Figure 13:
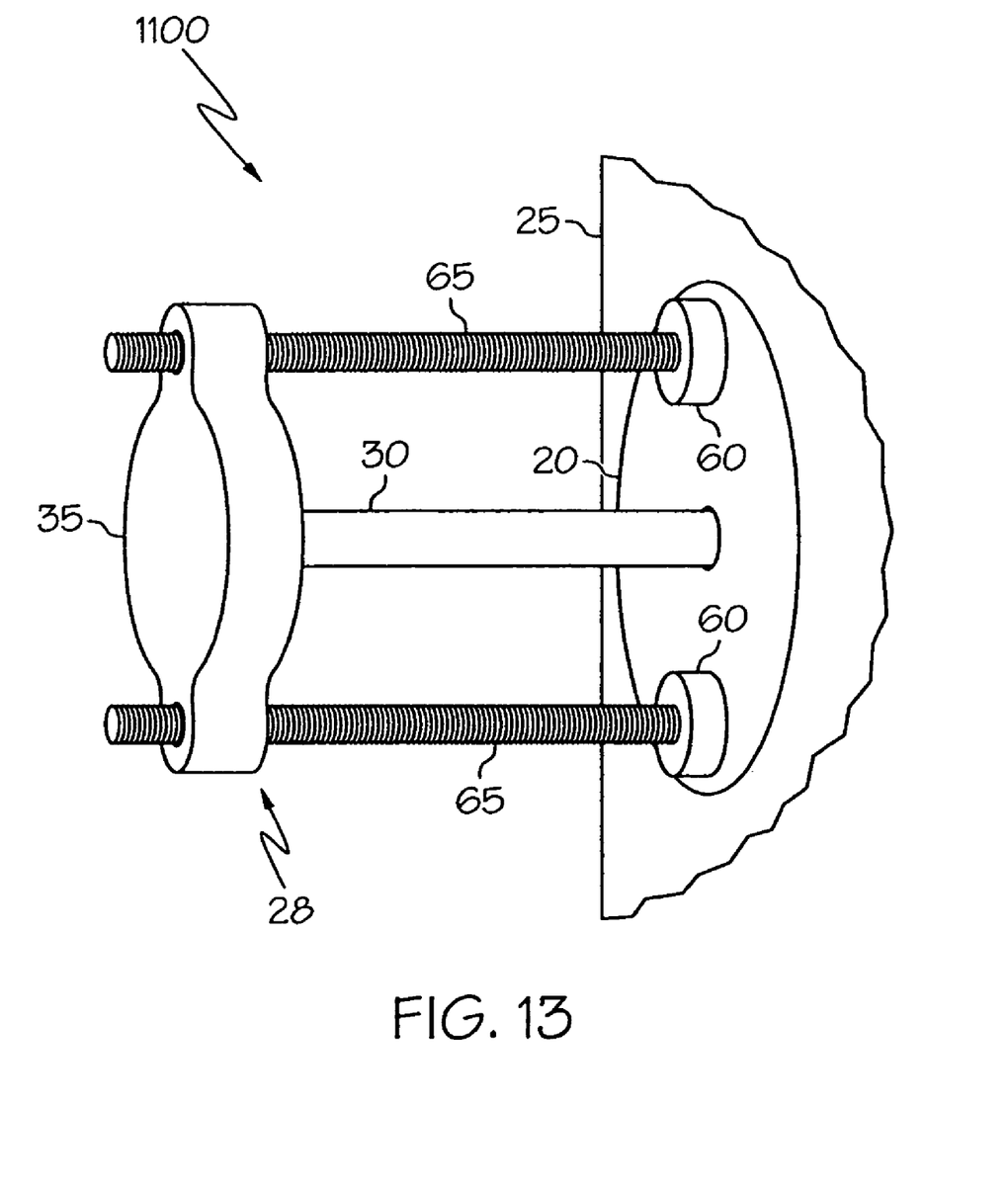
FIG. 13 is a schematic illustration of an exemplary sensor insertion/removal apparatus of the present invention.

Another embodiment of the present invention is depicted in FIG. 13. FIG. 13 illustrates an exemplary sensor apparatus 1100 having the capability of being automatically inserted into and/or removed from a chamber 10 through a probe port 55 at a predefined rate. The sensor apparatus 1100 comprises a sensor 28 and a port collar 20. The sensor 28 comprises a sensor shaft 30 and a probe head 35. The port collar 20 is configured to fit around the probe port 55 on the chamber 10. In addition, the port collar 20 is configured to allow a sensor shaft 30 to be inserted through the port collar 20 into the chamber 10. The sensor apparatus 1100 further comprises one or more motorized screw bases 60 and elongated screws 65 connected to the motorized screw bases 60, such that when the screw base 60 rotates, the attached elongated screw 65 is turned in a corresponding direction. The probe head 35 comprises at least one corresponding opening have threads configured to match the threads of the elongated screw 65. When the elongated screw 65 is rotated in a first direction, the probe head 35 is threaded down the elongated screw 65 and as a result, the sensor 28 is drawn into the chamber 10. Similarly, when the elongated screw 65 is rotated in a second direction, the probe head 35 is threaded up the elongated screw 65 which results in the sensor 28 being drawn away from the chamber 10.

Figure 14A:
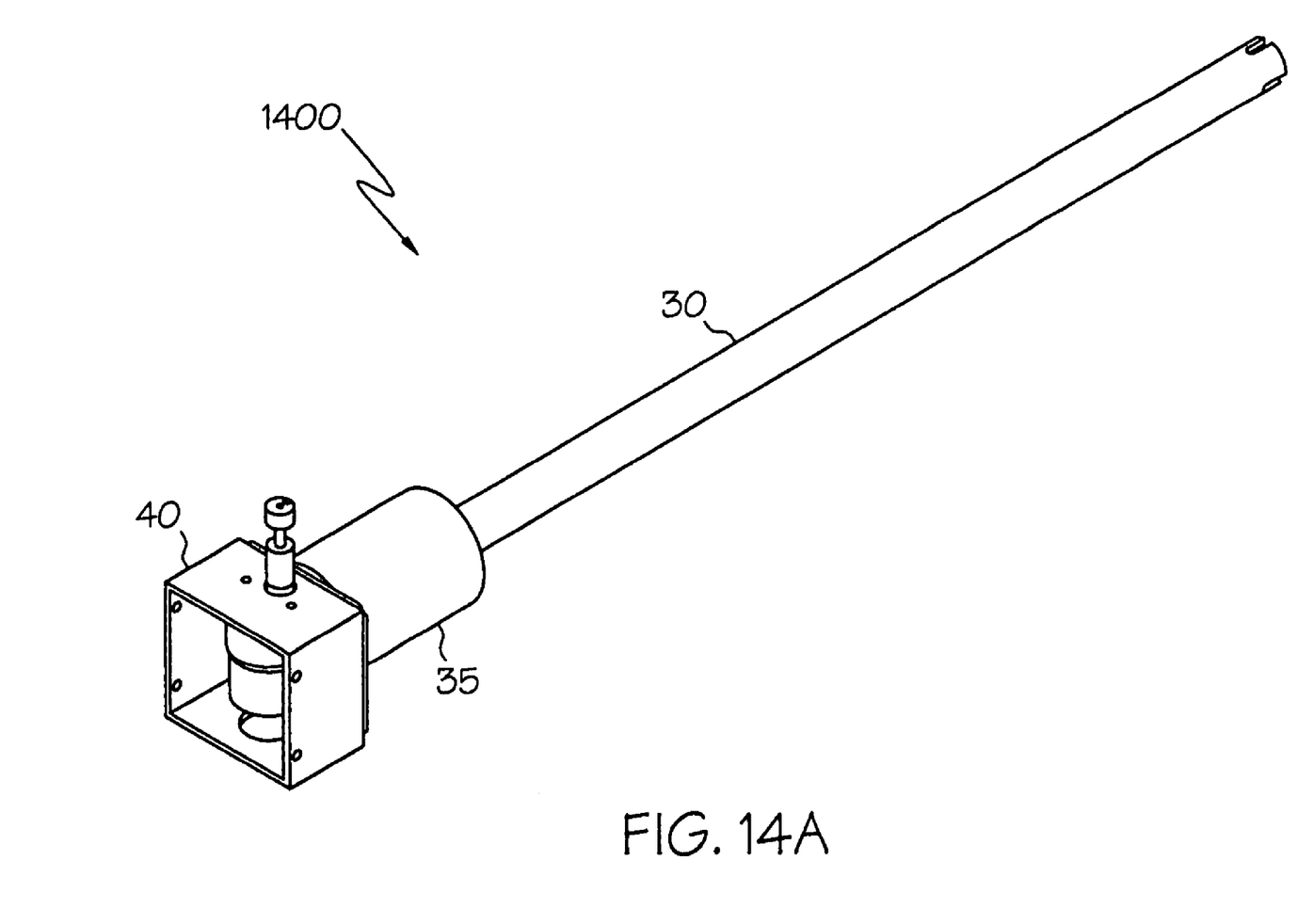
FIGS. 14A–C are schematic illustrations of an exemplary sensor insertion/removal apparatus of the present invention.
Figure 14B:
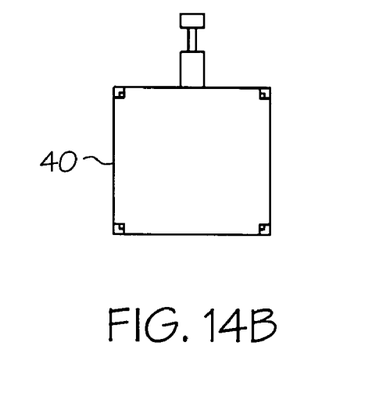
Figure 14C:
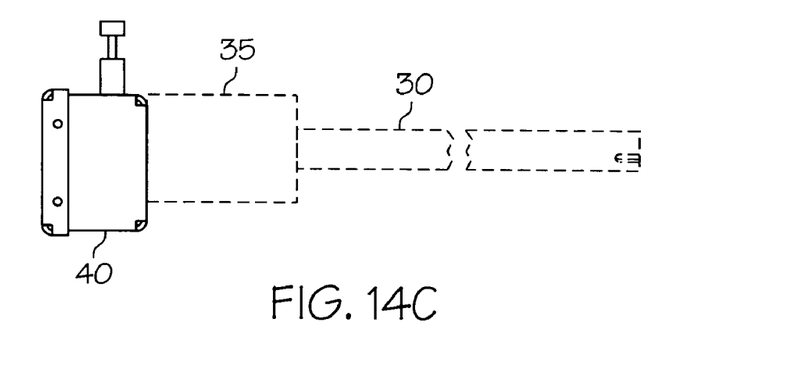

Yet another exemplary embodiment is depicted in FIGS. 14A–C. FIG. 14A illustrates an exemplary apparatus 1400 for inserting a sensor into a chamber through a probe port. The apparatus 1400 comprises a tension device 40 which is attached to the sensor probe head 35. In one exemplary embodiment, the tension device 40 is in communication with a cable attached near the probe port, and wherein the tension device is configured to place a force on the cable by winding up excess cable on the tension device, such that the sensor shaft 30 is drawn into the chamber at a predefined rate of insertion. FIGS. 14B and 14C depict schematic illustrations of different views of an exemplary apparatus of the present invention.

The foregoing description of the various embodiments of the invention has been presented for the purposes of illustration and description. It is not intended to be exhaustive or limit the invention to the precise form disclosed. Many alternatives, modifications, and variations will be apparent to those skilled in the art of the above teaching. Accordingly, this invention is intended to embrace all alternatives, modifications, and variations that have been discussed herein, and others that fall within the spirit and broad scope of the claims.

What is claimed:

1. An apparatus for inserting a sensor into a chamber, comprising:
   a port collar, wherein the port collar is configured to connect near to or at a sensor port of the chamber, and further wherein the port collar is configured to allow a sensor to be inserted through the port collar into the chamber;
   a cable attached to a tension device and the port collar; and
   wherein the tension device is configured to place a force on the cables attached to the tension device, such that the sensor is drawn into the chamber at a predefined rate of insertion.

2. A method for inserting a sensor into a chamber, comprising:
   attaching a port collar near to or at a sensor port of the chamber, wherein the port collar is configured to allow a sensor to be inserted through the port collar into the chamber;
   aligning a sensor to be inserted into the chamber through the port collar;
   attaching at least one tension device to the sensor, wherein the tension device is configured to draw the sensor into the chamber at a predetermined rate of insertion;
   attaching a cable to the port collar and to the tension device; and
   applying tension to the cable, wherein tension on the cable draws the sensor into the chamber at a predefined rate of insertion.

* * * * *